UNITED STATES PATENT OFFICE.

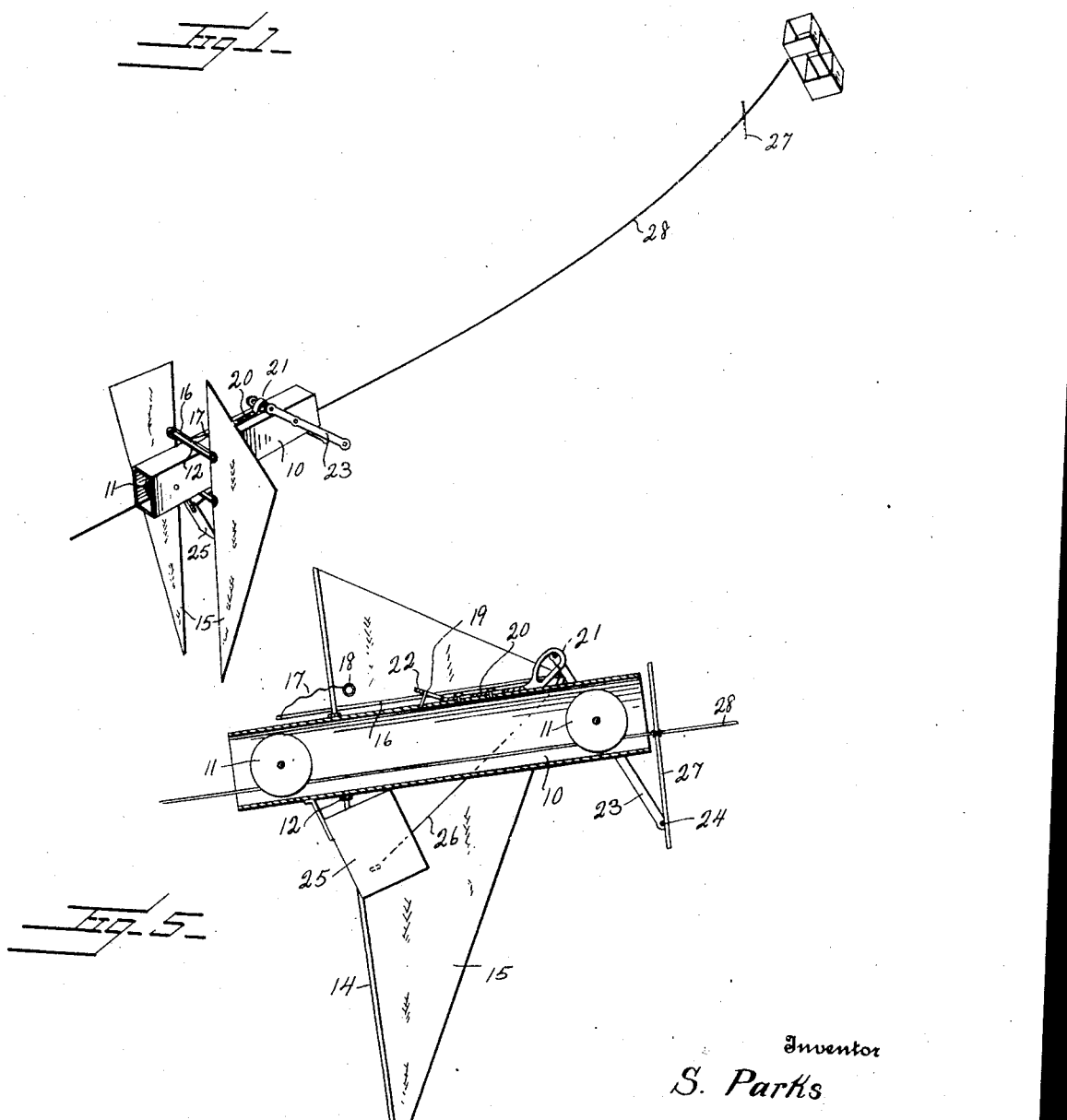

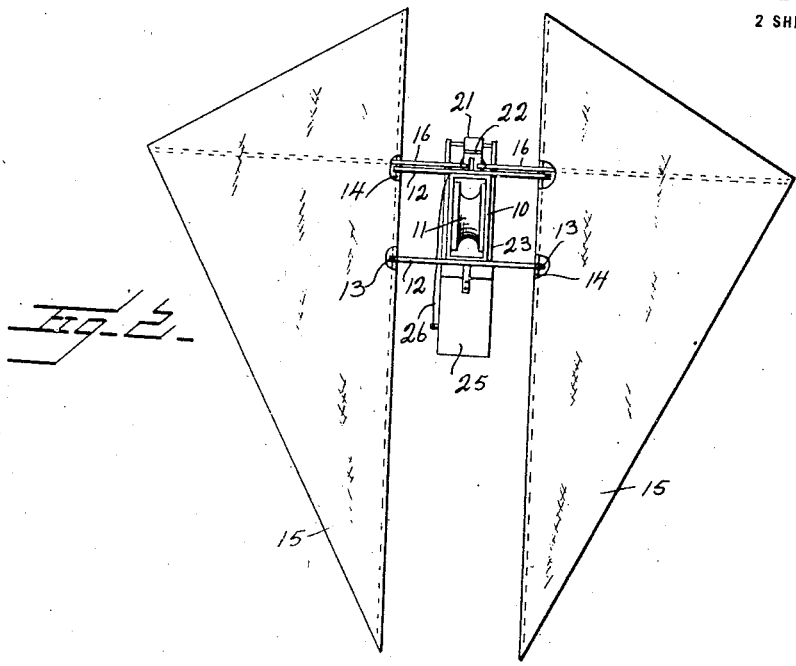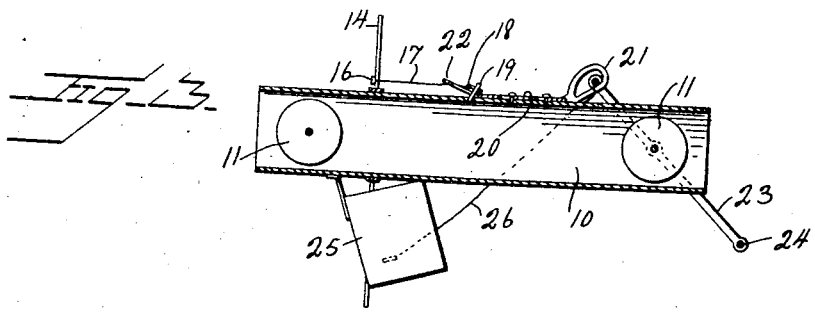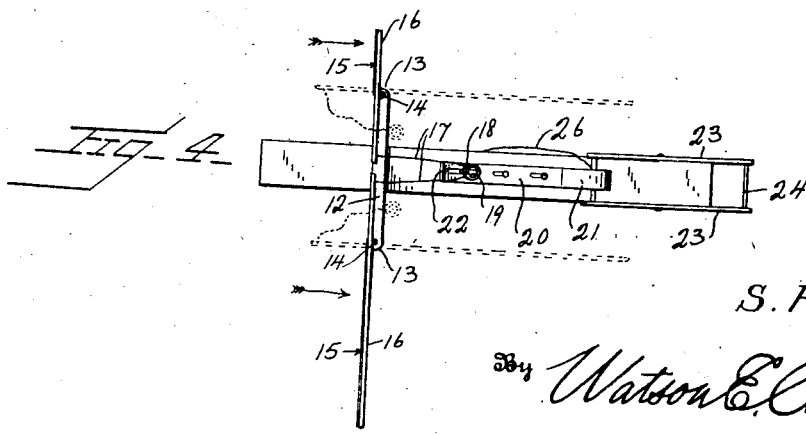

SAMUEL PARKS, OF LAS CRUCES, NEW MEXICO.

AERIAL PHOTOGRAPHY.

1,301,967. Specification of Letters Patent. Patented Apr. 29, 1919.

Application filed October 19, 1918. Serial No. 258,835.

*To all whom it may concern:*

Be it known that I, SAMUEL PARKS, a citizen of the United States residing at Las Cruces, in the county of Dona Ana and State of New Mexico, have invented certain new and useful Improvements in Aerial Photography, of which the following is a specification, reference being had to the accompanying drawings.

This invention relates to photographic appliances, and particularly to means for taking photographs from a kite supported camera.

The general object of this invention is the provision of means whereby a camera may be sent up or caused to travel upon a kite supported line to a predetermined altitude and then the shutter of the camera operated and when the shutter is operated the camera will return down the line to the operator without the necessity of drawing down the kite each time that a picture is taken.

A further object is to provide a device of this character comprising a camera carrier adapted to travel upon the kite line and provided with wings so arranged that when the camera has ascended to a predetermined point by the action of the wind on said wings, the shutter of the camera will be operated and the wings will be automatically collapsed or released so that the carrier will then return by gravity to the ground.

A further object is to provide a carrier of the character described with a shutter operating and wing releasing tripping device, which is adapted to be operated by means of an obstruction as, for instance, a transversely extending rod which is attached to the kite line.

A further object is to so construct the device that the camera may be sent up to its predetermined elevation very quickly, whereupon the picture will be automatically taken and the camera will automatically return so that the plate or film of the camera may be removed, a new plate inserted, and the camera again sent up so that successive pictures may be taken at relatively short intervals.

Other objects will appear in the course of the following description.

My invention is illustrated in the accompanying drawings, wherein:—

Figure 1 is a perspective view showing a camera carrier moving upward on the line of a supporting kite;

Fig. 2 is a rear face view of the carrier;

Fig. 3 is a longitudinal vertical section of the carrier;

Fig. 4 is a top plan view of the carrier showing in dotted lines the wings collapsed; and Fig. 5 is a longitudinal sectional view of the carrier, showing the action of the tripping mechanism and showing the wings collapsed.

Referring to these drawings, it will be seen that the carrier by which the camera is supported comprises a frame of any suitable form illustrated as having side pieces 10 connected to each other and spaced from each other, in any suitable manner, with rollers 11 mounted between the side pieces and adapted to engage upon and ride on the kite line. At one end of the frame, there are provided upper and lower cross pieces 12 having rings 13 at their ends. Rotatably mounted within each pair of rings is the vertical rod 14 of a wing 15. This wing 15 has the form of a right triangle and the wing is held in an expanded position by means of a strut 16 which extends inward beyond the rod 14 and carries on its inner extremity a cord 17 with a ring 18. The frame has upon its upper surface the upwardly projecting pin 19 over which the rings 18 of the two wings are normally disposed.

Mounted upon the upper face of the carrier for longitudinal sliding movement is a releasing rod 20 whose forward extremity is formed with a loop 21 and whose rearward extremity is formed with an upwardly inclined portion 22, disposed around or immediately adjacent to and against the pin 19. This upwardly inclined portion 22 acts as a wedge and when the member 20 is shifted longitudinally, this wedge will lift the rings 18 off from the pin 19. When the rings 18 are engaged with the pin 19 the wings 15 will be held against the pressure of the wind and held from swinging around into a position parallel to the carrier but when these rings 18 are detached from the pin 19 there is nothing then to resist the wind pressure on the wings and they will swing to a position parallel to the camera.

For the purpose of operating the releasing member 20 I mount upon the forward end of the carrier a lever which is approximately U-shaped in form to provide oppositely disposed legs 23 and a cross bar 24, these legs 23 being pivoted to the side piece 10 at the forward end thereof so that the lever normally extends downward and forward. The upper end of the lever connects to the loop 21 by a cross bar. Now it will be obvious that when the lower end of the lever is forced rearward as by contact with some obstruction on the kite line, the upper end of the lever will draw the sliding member 20 forward, thus releasing the rings 18 in the manner heretofore described.

The camera 25 is mounted upon the under side of the carrier in any suitable manner, so as to be disposed in a normally depending position and its shutter release, which may be of any suitable construction, is attached to a cord or wire 26 which in turn extends up to and is connected with the forward end of the member 20. This member 20, therefore, constitutes not only a wing release but a shutter actuating device.

Previous to sending up the kite, which may be an ordinary box kite, or any other suitable kite, an obstruction, as for instance a transverse rod 27, about the size of a lead pencil, is attached to the kite cord 28 at any desired point on the cord and when the kite has been sufficiently elevated so that a proper elevation has been secured for the obstruction 27, the carrier is placed upon the cord with the wings expanded, and held in their expanded position against the action of the wing by the rings 18. The wind pressure acting on these wings, shifts the carrier up the kite line, until the lever 23—24 reaches the obstruction on the kite line, whereupon the lever will be depressed, the releasing device 20 will be shifted, the shutter will be actuated, and the releasing device will detach the rings 18 from their engagement with the pin 19. The pressure of the wind will then cause the wings to swing around into a position parallel to the carrier and camera and as they then offer little or no resistance to the air, gravity will instantly cause the carrier to move downward on the kite line until the carrier reaches the operator who changes the plate or film within the camera, re-sets the wings and the tripping mechanism, and if desired starts the carrier on another journey.

Inasmuch as the kite line, particularly with the weight of the camera upon it, has the form of a catenary curve, the lower end of the kite line will be approximately horizontal and thus as the carrier and camera near the operator, their downward movement will be more and more retarded so that the camera will arrive in the operator's hands without any great degree of shock.

The kite used may be of any ordinary character, as for instance the ordinary tailless model and in all probability a very light but strong wire will be used as the kite line. If the wind is not in the direction required, the view can be taken backward over the operator's head and it is obvious that the camera can be so set as to take the view in any direction required. The speed of operation, of course, depends largely upon the strength of the breeze but I have found by actual use that the carrier can be operated to lift the camera to any desired height on the kite line, by a breeze of 6 or 8 miles per hour and the camera has been used in a storm with a wind velocity of 50 miles per hour. The camera, under certain circumstances, has made an ascent of 500 feet in eight seconds, but the speed with which the carrier will travel up the line with the camera, of course, depends somewhat upon the weight of the camera and the strength of the wind. Many sizes and kinds of camera can be, of course, used, but a convenient form of camera for this purpose consists of a fixed focus, box camera, with a rotary shutter and a meniscus lens attached to the carrier at the angle desired.

In the actual use of this device the kite is first sent up to the required altitude and may, if desired, remain there some time as a target to draw the fire of the enemy and expose his location. Even if this kite should be shot down, which is very improbable, it can be at once replaced at a very slight cost. The total weight of the kite, carrier, camera, etc. need not be over ten pounds and the cost of the whole apparatus need not be over $10 including the camera lens.

While I have heretofore referred to a kite as being the means for supporting the line on which the carrier operates, it is obvious that any other aerial supporting means might be used for this purpose provided the line on which the carrier operated could be carried away from the supporting means at a sufficient angle to permit the ascent of the carrier.

With my device any number of pictures may be taken while the kite is up by simply changing the plate or film in the camera and sending the carrier up again with a reloaded camera. This device can be used for taking detail views of terrain immediately adjacent a sector and it is obvious that by its use any sector commander can have a fresh view of the ground immediately in front of his sector or at the side thereof when or where he needs it without the necessity of waiting for views made by airplanes. This device may be operated by one man alone and is so light that it may be easily transported from place to place.

While I have illustrated certain details of construction which I have found to be thoroughly effective yet I do not wish to be limited to this as it is obvious that many changes may be made in the detailed construction of the carrier and of the tripping mechanism.

While I have illustrated this device as applied to tripping a camera shutter and returning the camera to the operator's hand, yet the carrier may also be used for any other purpose for which it may be adapted.

This device can also be used for carrying any desired instrument to any desired elevation along the kite line or other supporting line, causing the tripping of said kite wings thus permitting the descent of the instrument by gravity along the kite line. Thus registering barometers or thermometers or other instruments of like character may be operated to determine the condition of the air at certain elevations or other observations or tests may be made.

I claim:—

1. An apparatus of the character described including a supporting line, means for supporting the line in the air at an inclination, a traveling carrier movable along the line, a tripping device on the carrier, an instrument supported by the carrier and having actuating means operatively connected to said tripping device, propelling means for causing the movement of the carrier up the line by wind pressure, and means for actuating the tripping device after the carrier has reached a predetermined point to thereby actuate the instrument and simultaneously render said propelling means inoperative and permit the descent of the carrier by gravity.

2. An apparatus for aerial photography including a carrier adapted to travel along a kite line having thereon an obstacle, a camera supported by the carrier and having shutter actuating devices, propelling means mounted on the carrier for causing it to move upward on the kite line, and a tripping device on the carrier operatively connected to the propelling means to render the propelling means inoperative when the device is tripped and operatively connected to the shutter actuating device to release the shutter when the device is tripped, the tripping device being actuated by meeting the obstacle on the kite line.

3. An apparatus for aerial photography including a supporting line, means for supporting the line at an inclination in the air, a carrier adapted to travel along the line, a camera supported by the carrier and having a shutter actuating mechanism, propelling means mounted on the carrier for causing it to move upward on the supporting line, a tripping device on the carrier operatively connected to the propelling means to render the propelling means inoperative when the device is tripped and operatively connected to the shutter operating mechanism to simultaneously release the same when the device is tripped, and a member mounted upon the supporting line at a predetermined elevation adapted to engage the tripping device when the carrier has reached said elevation and thereby actuate the camera shutter and render the propelling means inoperative.

4. An apparatus for aerial photography including a supporting line, means for supporting the line in the air at an inclination, a traveling carrier movable along the line, wings mounted upon the carrier normally held in an expanded position, whereby to cause the carrier to move upward on the line by the wind pressure, a tripping device mounted on the carrier operatively connected to the shutter operating mechanism of the camera and to said wings to release the latter when the tripping device is actuated to thereby permit the collapse of the wings and the descent of the carrier and camera by gravity, said tripping device being connected to the shutter actuating mechanism of the camera, and means on the supporting line at a predetermined elevation engageable by the tripping device when the carrier has reached said predetermined elevation to thereby cause the actuation of the tripping device and the simultaneous release of the shutter and said wings.

5. An apparatus for aerial photography comprising a kite, a line supported thereby, a carrier having wheels engaging the line and movable therealong, wings mounted on the carrier and normally supported in an expanded position, a tripping lever mounted on the forward end of the carrier, a tripping device operatively engaged with the lever and normally holding the wings in expanded position against wind pressure and operatively connected to the shutter operating mechanism of the camera, and an obstruction of the kite line with which said tripping lever engages when the carrier has risen to a predetermined elevation to thereby release the wings to permit the descent of the carrier under gravity and simultaneously release the shutter actuating mechanism.

6. An apparatus for aerial photography comprising a carrier having wheels adapted to pass along a supporting line, a camera supported by the carrier and having a shutter actuating mechanism, wings hingedly mounted on each side of the carrier and each having a transverse strut, shiftable means engaging said struts to hold the wings in an expanded position, a movable tripping device mounted on the carrier and when shifted adapted to engage with said holding means to release the same and thereby release the wings and permit them to swing into a position parallel to the carrier, a shutter operating connection connected to the shutter actuating mechanism and to said shiftable means, and a trip lever mounted upon the forward end of the camera and engaging said shiftable means.

7. An apparatus for aerial photography including a carrier having wheels adapted to travel along a supporting line having thereon an obstruction, a camera supported by the carrier and having shutter actuated mechanism, laterally disposed wings hingedly mounted upon the carrier and each having a transversely extending strut extending over the carrier, flexible connections attached to the inner ends of the struts, a pin with which said flexible connections are detachably engaged to hold the wings disposed in a plane transverse to the longitudinal axis of the carrier, a longitudinally shiftable member mounted upon the carrier and adapted when shifted to release said connections from their engagement with the pin, a shutter operating connection extending from the shutter actuating devices of the camera to said member, and a lever mounted upon the forward end of the carrier and operatively connected to the shiftable member, the lever being adapted to be actuated by engagement with the obstruction on the kite line.

8. An apparatus for aerial photography including a tubular body adapted to surround a supporting line having thereon an obstruction, wheels mounted within the tubular body and adapted to engage said line, laterally disposed wings hinged to the body, a shiftable member mounted upon the body, connections between said shiftable member and the wings normally holding the wings in a plane transverse to the body and in active position, and a lever mounted upon the forward end of the body and operatively connected to the shiftable member, the lever being adapted to be actuated by engagement with the obstruction on the supporting line, said shiftable member when shifted by an actuation of the lever releasing said wings to permit them to turn to a position parallel to the body.

9. An apparatus for aerial photography including a carrier comprising a tubular body adapted to surround a kite line having thereon an obstruction, said carrier having wheels within the body traveling along the kite line, laterally disposed wings hingedly mounted upon the body for movement in a plane parallel thereto, transversely extending struts mounted on the wings and normally extending across the body, flexible connections attached to the inner ends of the struts, a shiftable member mounted upon the body and normally engaging said flexible connections, but when shifted in one direction releasing said flexible connections to permit the wings to fold into a position parallel to the body, and a lever mounted upon the forward end of the body and operatively connected to the shiftable member, the lever being adapted to be actuated by engagement with the obstruction on the kite line.

In testimony whereof I hereunto affix my signature in the presence of two witnesses.

SAMUEL PARKS.

Witnesses:
IsIDORO ARMIJO,
W. L. SHAW.